US011216799B1

(12) United States Patent
Ji et al.

(10) Patent No.: US 11,216,799 B1
(45) Date of Patent: Jan. 4, 2022

(54) SECURE GENERATION OF ONE-TIME PASSCODES USING A CONTACTLESS CARD

(71) Applicant: Capital One Services, LLC, McLean, VA (US)

(72) Inventors: Jason Ji, Reston, VA (US); Jeffrey Rule, Chevy Chase, MD (US); Colin Hart, Arlington, VA (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/140,698

(22) Filed: Jan. 4, 2021

(51) Int. Cl.
*G06Q 20/32* (2012.01)
*G06Q 20/38* (2012.01)
(Continued)

(52) U.S. Cl.
CPC ..... *G06Q 20/3226* (2013.01); *G06Q 20/3278* (2013.01); *G06Q 20/386* (2020.05);
(Continued)

(58) Field of Classification Search
CPC ............. G06Q 20/3226; G06Q 20/386; G06Q 20/3278; G06Q 20/38215; G06Q 20/401; H04L 63/0838
(Continued)

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 A1 7/2017
CN 101192295 A 6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — James D Nigh
(74) *Attorney, Agent, or Firm* — Kacvinsky Daisak Bluni PLLC

(57) ABSTRACT

Systems, methods, apparatuses, and computer-readable media for secure generation of one-time passcodes using a contactless card. In one example, an operating system (OS) of a device may receive a uniform resource locator (URL) and a cryptogram from a contactless card. The OS may launch an application associated with the URL. The application may transmit the cryptogram to an authentication server. The application may receive a decryption result from the authentication server indicating the authentication server decrypted the cryptogram. Based on the decryption result, the application may request an OTP. The processor may receive an OTP from an OTP generator. The application may receive an input value and compare the input value to a copy of the OTP. The application may determine that the comparison results in a match, and display, based on the determination that the comparison results in the match, one or more attributes of the account.

20 Claims, 13 Drawing Sheets

(51) Int. Cl.
*H04L 29/06* (2006.01)
*G06Q 20/40* (2012.01)
(52) U.S. Cl.
CPC ..... *G06Q 20/38215* (2013.01); *G06Q 20/401* (2013.01); *H04L 63/0838* (2013.01)
(58) Field of Classification Search
USPC .......................................................... 705/75
See application file for complete search history.

(56) References Cited

U.S. PATENT DOCUMENTS

| | | | |
|---|---|---|---|
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |
| 5,763,373 A | 6/1998 | Robinson et al. | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Douceur et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Holtmanns et al. | |
| 7,652,578 B2 | 1/2010 | Braun et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Kaminkow | |
| 8,005,426 B2 | 8/2011 | Huomo et al. | |
| 8,010,405 B1 | 8/2011 | Bortolin et al. | |
| RE42,762 E | 9/2011 | Shin et al. | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,285,329 B1 | 10/2012 | Zhu | |

(56) References Cited

U.S. PATENT DOCUMENTS

| | | |
|---|---|---|
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |

(56) References Cited

U.S. PATENT DOCUMENTS

| | | |
|---|---|---|
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211929 A1* | 8/2013 | Itwaru ................ G06Q 20/352 705/16 |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |

(56) References Cited

U.S. PATENT DOCUMENTS

| | | |
|---|---|---|
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0307190 A1 * | 10/2016 | Zarakas ............ G06Q 20/3829 |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0005227 A1 * | 1/2018 | Sandelov ............... G06K 7/087 |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2019/0347888 A1 * | 11/2019 | Agbeyo ............. G06K 7/10297 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

(56) References Cited

OTHER PUBLICATIONS

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017

(56) References Cited

OTHER PUBLICATIONS

[retrieved on Jul. 3, 2019]. Retrieved from Internet URL: htttps://www.annexcloude.com/blog/benefits-unified-platform/, 13 pages.

* cited by examiner

US 11,216,799 B1

SECURE GENERATION OF ONE-TIME PASSCODES USING A CONTACTLESS CARD

TECHNICAL FIELD

Embodiments disclosed herein are related to computing systems. More specifically, embodiments disclosed herein are related to computing systems that provide for secure generation of one-time passcodes using a contactless card.

BACKGROUND

One-time passcodes may be used as a second form of authentication. However, one-time passcodes are susceptible to many security risks. For example, if a user leaves their smartphone unlocked in a public place, passersby may have access to any passcodes sent to the device. Similarly, if a malicious user gains access to the device and/or the account where the passcodes are sent, the malicious user may have access to the passcodes. Doing so may allow the malicious user to access account data and other sensitive information.

SUMMARY

Systems, methods, apparatuses, and computer-readable media for secure generation of one-time passcodes using a contactless card. In one example, an operating system (OS) executing on a processor of a device may receive a uniform resource locator (URL) and a cryptogram from a contactless card associated with an account. The OS may launch an application associated with the contactless card. The application may transmit the cryptogram to an authentication server. The application may receive a decryption result from the authentication server indicating the authentication server decrypted the cryptogram. Based on the decryption result, the application may transmit a request for a one-time passcode (OTP) comprising an identifier to the URL. The processor may receive an OTP from an OTP generator at the URL. The application may receive an input value and compare the input value to a copy of the OTP received from the OTP generator. The application may determine that the comparison results in a match, and display, based on the determination that the comparison results in the match, one or more attributes of the account on the device.

DETAILED DESCRIPTION

Figure 1A:
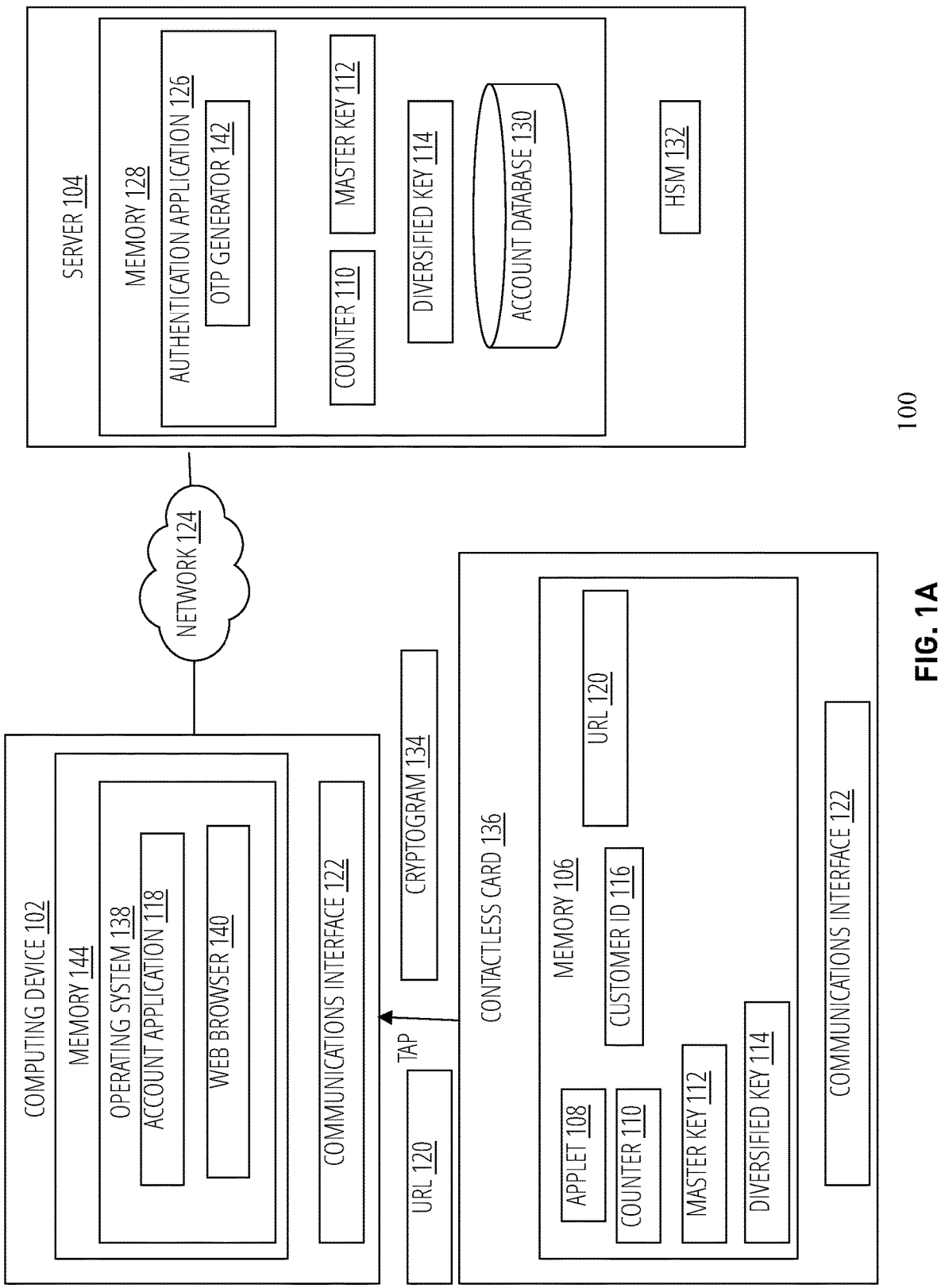
FIG. 1A illustrates an aspect of the subject matter in accordance with one embodiment.

Embodiments disclosed herein provide techniques to securely generate a one-time passcode (OTP) that may be used as a second form of authentication. Generally, a user may desire to authenticate into an account, complete a purchase, or perform any operation that requires multi-factor authentication (MFA). In one example, the user may tap a contactless card to a computing device to initiate the authentication. In response to coming into communications range with the device, the contactless card may generate a data package comprising a cryptogram and a uniform resource locator (URL). An operating system of the device may read the data package and/or the URL and launch an account application on the device that is associated with the URL. In one example, the account application is associated with an issuer of the contactless card. The account application may transmit an OTP request to an OTP generator at the URL. The OTP request may include the cryptogram.

The OTP generator and/or a server associated with the OTP generator may then attempt to decrypt the cryptogram as described in greater detail herein. If the decryption is successful, the OTP generator may identify contact information for the associated account, such as a phone number, email, etc. The OTP generator may generate an OTP and transmit the OTP to the identified contact information. The user may then receive the OTP from the OTP generator and provide the received OTP as input to the account application. The account application may compare the input to an instance of the OTP received from the OTP generator. If the comparison results in a match, the account application may validate the OTP, and permit the requested operation, e.g., viewing account details, making a purchase, etc. If the comparison does not result in a match, the verification may fail, and the account application may reject or otherwise restrict performance of the requested operation.

Advantageously, embodiments disclosed herein provide secure techniques for generating an OTP for multi-factor authentication using a contactless card. By leveraging cryptograms generated by contactless cards, embodiments of the disclosure may securely verify the identity of the user requesting to perform an operation with minimal risk of fraudulent activity. Furthermore, doing so ensures that OTP codes are only generated when the user has access to a contactless card as well as a computing device with a secure application for facilitating the cryptogram verification with the server. Furthermore, by providing a simplified OTP generation process, more requests may be handled by the server, thereby improving system performance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary computing architecture 100, also referred to as a system, consistent with disclosed embodiments. Although the computing architecture 100 shown in FIGS. 1A-1C has a limited number of elements in a certain topology, it may be appreciated that the computing architecture 100 may include more or less elements in alternate topologies as desired for a given implementation.

The computing architecture 100 comprises a computing device 102, a server 104, and a contactless card 136. The contactless card 136 is representative of any type of payment card, such as a credit card, debit card, ATM card, gift card, and the like. The contactless card 136 may comprise one or more communications interfaces 122, such as a radio frequency identification (RFID) chip, configured to communicate with a communications interface 122 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing system, merchant terminals, point-of-sale systems, servers, desktop computers, and the like. A mobile device is used as an example of the computing device 102, but should not be considered limiting of the disclosure. The server 104 is representative of any type of computing device, such as a server, workstation, compute cluster, cloud computing platform, virtualized computing system, and the like. Although not depicted for the sake of clarity, the computing device 102, contactless card 136, and server 104 each include one or more processor circuits to execute programs, code, and/or instructions.

As shown, a memory 106 of the contactless card 136 includes an applet 108, a counter 110, a master key 112, a diversified key 114, and a unique customer identifier (ID) 116. The applet 108 is executable code configured to perform the operations described herein. The counter 110, master key 112, diversified key 114, and customer ID 116 are used to provide security in the system 100 as described in greater detail below.

As shown, a memory 144 of the mobile device 102 includes an instance of an operating system (OS) 138. Example operating systems 138 include the Android® OS, iOS®, macOS®, Linux®, and Windows® operating systems. As shown, the OS 138 includes an account application 118 and a web browser 140. The account application 118 allows users to perform various account-related operations, such as activating payment cards, viewing account balances, purchasing items, processing payments, and the like. In some embodiments, a user may authenticate using authentication credentials to access certain features of the account application 118. For example, the authentication credentials may include a username (or login) and password, biometric credentials (e.g., fingerprints, Face ID, etc.), and the like. The web browser 140 is an application that allows the device 102 to access information via the network 124 (e.g., via the Internet).

As shown, a memory 128 of the server 104 includes an authentication application 123, which includes an OTP generator 142. Although depicted as integrated components of the server 104, in some embodiments, the authentication application 123 and the OTP generator 142 may be separated into distinct components. Furthermore, the authentication application 123 and/or the OTP generator 142 may be implemented in hardware, software, and/or a combination of hardware and software.

In some embodiments, to secure the account application 118 and/or associated data, e.g., details of the user's account in the account database 130, the system 100 may provide for secure generation of OTPs using the contactless card 136. For example, a user may provide authentication credentials to the account application 118, such as a username/password that are validated by the account application 118 (e.g., using a local instance of the account database 130 and/or transmitting the credentials to the server 104 for validation). Once validated, the account application 118 may instruct the user to tap the contactless card 136 to the computing device 102.

In the embodiment depicted in FIG. 1A, the user may tap the contactless card 136 to the computing device 102 (or otherwise bring the contactless card 136 within communications range of the card reader 122 of the device 102). The applet 108 of the contactless card 136 may then generate a URL 120 that is directed to a resource, such as the server 104, the authentication application 126, and/or the OTP generator 142. In some embodiments, the applet 108 constructs the URL 120 according to one or more rules. In some embodiments, the contactless card 136 stores a plurality of URLs 120 and the applet 108 selects the URL 120 from the plurality of URLs 120 based on one or more rules. In some embodiments, the applet 108 may generate the URL 120 by selecting a URLs 120 and adding dynamic data, such as a cryptogram 134, as one or more parameters of the URL.

The cryptogram 134 may be based on the customer ID 116 of the contactless card 136. The cryptogram 134 may be generated based on any suitable cryptographic technique. In some embodiments, the applet 108 may include the URL 120, the cryptogram 134, and an unencrypted identifier (e.g., the customer ID 116, an identifier of the contactless card 136, and/or any other unique identifier) as part of a data package. In at least one embodiment, the data package is an NDEF file.

As stated, the computing architecture 100 is configured to implement key diversification to secure data, which may be referred to as a key diversification technique herein. Generally, the server 104 (or another computing device) and the contactless card 136 may be provisioned with the same master key 112 (also referred to as a master symmetric key). More specifically, each contactless card 136 is programmed with a distinct master key 112 that has a corresponding pair in the server 104. For example, when a contactless card 136 is manufactured, a unique master key 112 may be programmed into the memory 106 of the contactless card 136. Similarly, the unique master key 112 may be stored in a record of a customer associated with the contactless card 136 in the account database 130 of the server 104 (and/or stored in a different secure location, such as the hardware security module (HSM) 132. The master key 112 may be kept secret from all parties other than the contactless card 136 and server 104, thereby enhancing security of the system 100. In some embodiments, the applet 108 of the contactless card 136 may encrypt and/or decrypt data (e.g., the customer ID 116) using the master key 112 and the data as input a cryptographic algorithm. For example, encrypting the customer ID 116 with the master key 112 may result in the cryptogram 134. Similarly, the server 104 may encrypt and/or decrypt data associated with the contactless card 136 using the corresponding master key 112.

In other embodiments, the master keys 112 of the contactless card 136 and server 104 may be used in conjunction with the counters 110 to enhance security using key diversification. The counters 110 comprise values that are synchronized between the contactless card 136 and server 104. The counter 110 may comprise a number that changes each time data is exchanged between the contactless card 136 and the server 104 (and/or the contactless card 136 and the computing device 102). When preparing to send data (e.g., to the server 104 and/or the device 102), the applet 108 of the contactless card 136 may increment the counter 110. The applet 108 of the contactless card 136 may then provide the master key 112 and counter 110 as input to a cryptographic algorithm, which produces a diversified key 114 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the applet 108 may then encrypt the data (e.g., the customer ID 116 and/or any other data) using the diversified key 114 and the data as input to the cryptographic algorithm. For example, encrypting the customer ID 116 with the diversified key 114 may result in an encrypted customer ID (e.g., a cryptogram 134). In some embodiments, the cryptogram 134 is included in as a parameter of the URL 120. In other embodiments, the cryptogram 134 is not a parameter of the URL 120, but is transmitted with the URL 120 in a data package such as an NDEF file. The operating system 138 may then read the data package including the URL 120 and cryptogram 134 via the communications interface 122 of the computing device 102.

As stated, the cryptogram 134 may be a parameter of the URL 120. For example, the URL 120 may be "http://www.example.com/OTPgenerator?param=ABC123". In such an example, the cryptogram 134 may correspond to the parameter "ABC123". However, if the cryptogram 134 is not a parameter of the URL 120, the URL 120 may be "http://www.exmaple.com/OTPgenerator." Regardless of whether the URL 120 includes the cryptogram 134 as a parameter, the URL 120 may be registered with the account application 118, which causes the operating system 138 to launch the account application 118, and provide the URL 120 and cryptogram 134 to the account application 118 as input.

The account application 118 may then transmit the cryptogram 134 to the server 104 with a request to generate an OTP. In embodiments where the URL 120 includes the cryptogram 134 as a parameter, the account application 118 extracts the cryptogram 134 from the URL 120 and transmits the request with cryptogram 134 to an address associated with the OTP generator 142, e.g., at least a portion of the URL 120. In some embodiments, the 118 makes an application programming interface (API) call to the OTP generator 142. Further still, the account application 118 may include another identifier, such as the unencrypted customer ID 116 provided by the applet 108 in the data package. In some embodiments, the another identifier may be an identifier of the contactless card 136, an account identifier, and the like. In such embodiments, the account application 118 may include an instance of one or more portions of the account database 130 to determine the another identifier.

Figure 1B:
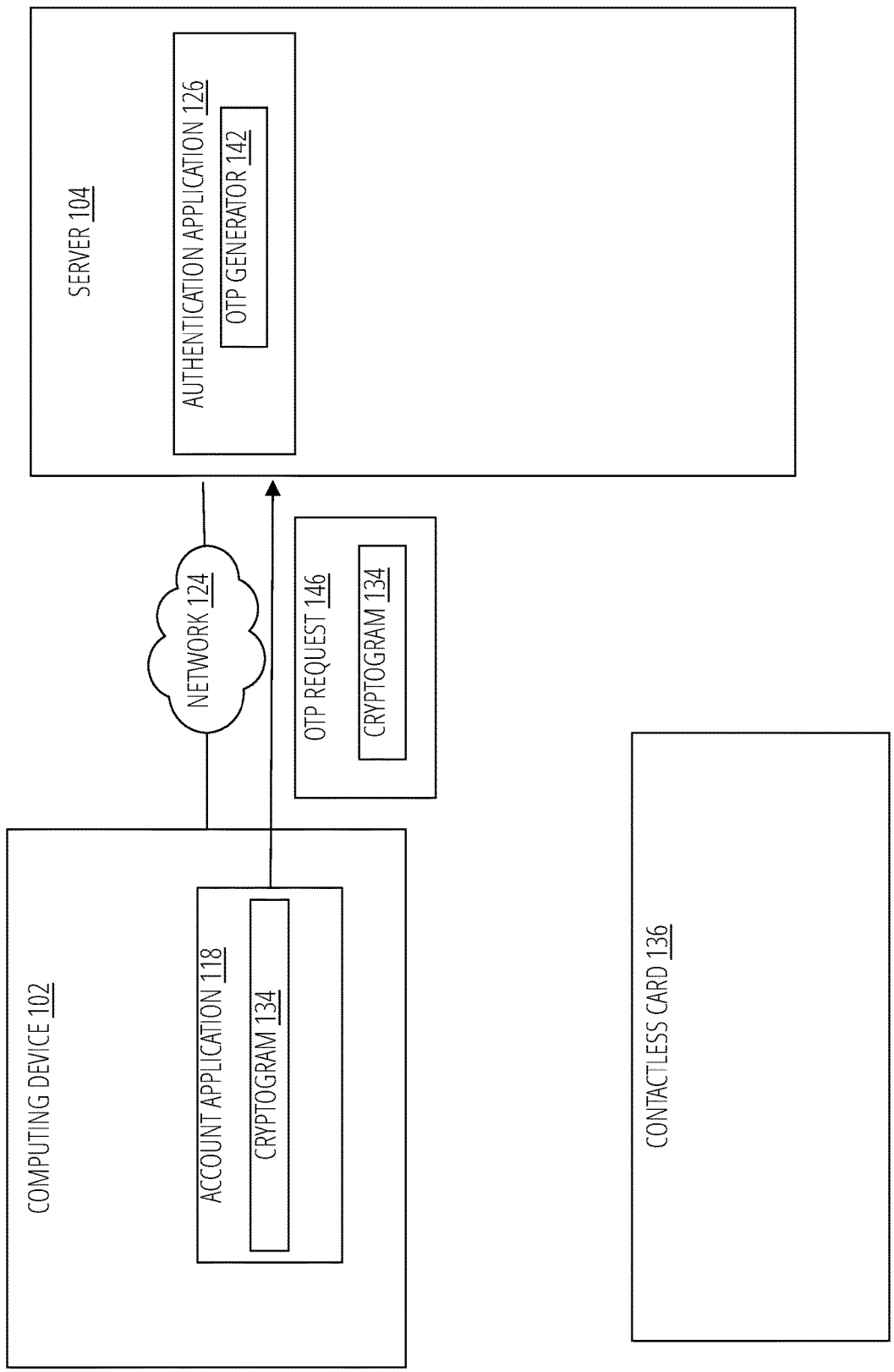
FIG. 1B illustrates an aspect of the subject matter in accordance with one embodiment.

FIG. 1B depicts an embodiment where the account application 118 transmits an OTP request 146 comprising the cryptogram 134 and the unencrypted identifier to the server 104. Once received, the server 104 may attempt to authenticate the cryptogram 134. For example, the authentication application 126 may attempt to decrypt the cryptogram 134 using a copy of the master key 112 stored by the server 104. In some embodiments, the authentication application 126 may identify the master key 112 and counter 110 using the unencrypted customer ID 116 (or other identifier) provided by the account application 118 to the server 104. In some examples, the authentication application 126 may provide the master key 112 and counter 110 as input to the cryptographic algorithm, which produces a diversified key 114 as output. The resulting diversified key 114 may correspond to the diversified key 114 of the contactless card 136, which may be used to decrypt the cryptogram 134.

Regardless of the decryption technique used, the authentication application 126 may successfully decrypt the cryptogram 134, thereby verifying or authenticating the cryptogram 134 in the OTP request 146 (e.g., by comparing the customer ID 116 that is produced by decrypting the cryptogram 134 to a known customer ID stored in the account database 130, and/or based on an indication that the decryption using the master key 112 and/or diversified key 114 was successful). Although the keys 112, 114 are depicted as being stored in the memory 128, the keys may be stored elsewhere, such as in a secure element and/or the HSM 132. In such embodiments, the secure element and/or the HSM 132 may decrypt the cryptogram 134 using the master key 112 and/or diversified key 114 and a cryptographic function. Similarly, the secure element and/or HSM 132 may generate the diversified key 114 based on the master key 112 and counter 110 as described above. If the decryption is successful, the authentication application 126 may identify contact information for the user, e.g., an email address, phone number, a device identifier registered to the instance of the account application 118, a device identifier of the computing device 102, etc., stored in the account database 130. The authentication application 126 may identify the contact information based on the unencrypted identifier included in the OTP request 146. The authentication application 126 may then instruct the OTP generator 142 to generate an OTP and transmit the OTP to the identified contact information.

If, however, the authentication application 126 is unable to decrypt the cryptogram 134 to yield the expected result (e.g., the customer ID 116 of the account associated with the contactless card 136), the authentication application 126 does not validate the cryptogram 134. In such an example, the authentication application 126 determines to refrain from generating an OTP. The authentication application 126 may transmit an indication of the failed decryption to the account application 118.

Figure 1C:
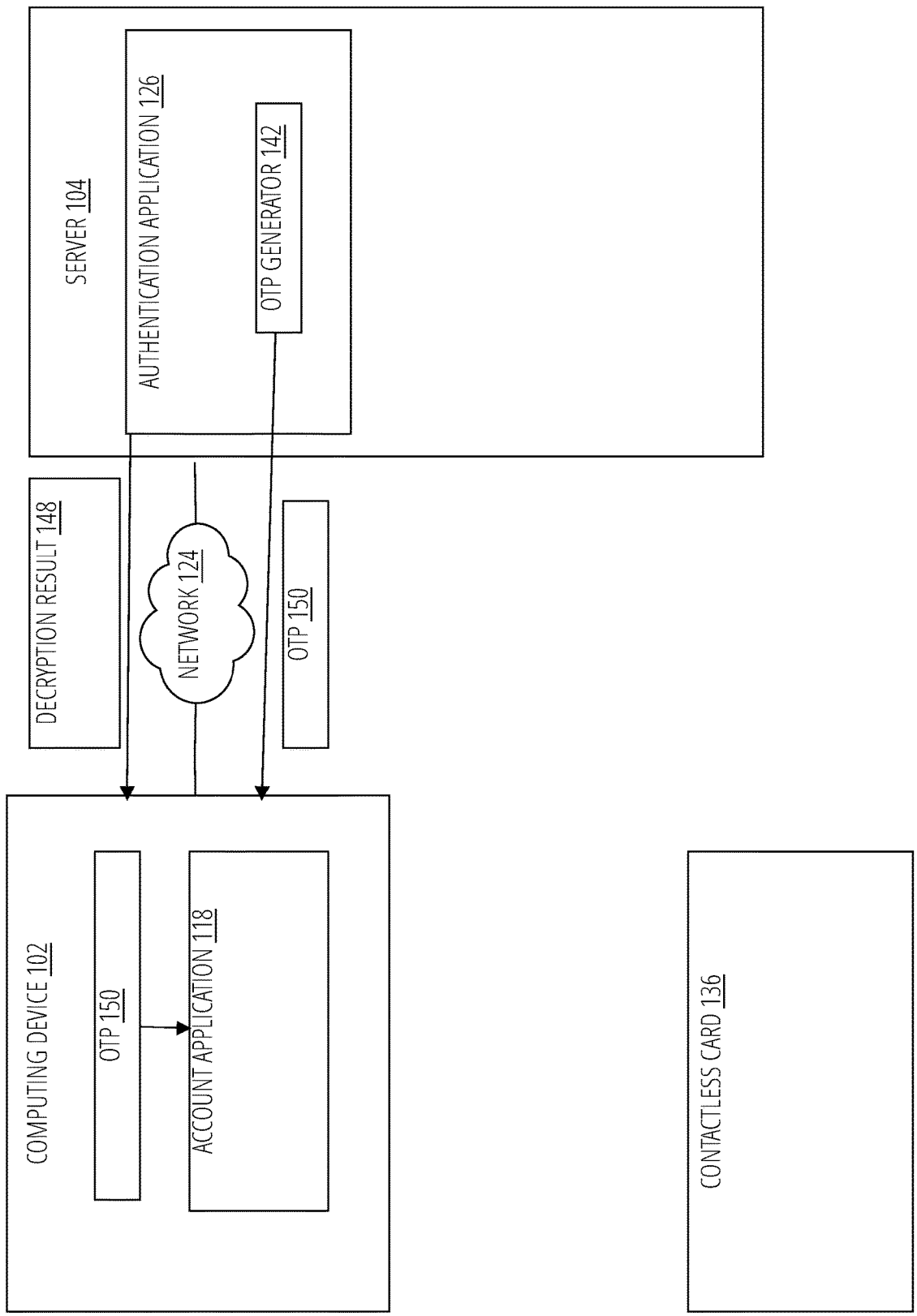
FIG. 1C illustrates an aspect of the subject matter in accordance with one embodiment.

FIG. 1C depicts an embodiment where the authentication application 126 transmits a decryption result 148 to the account application 118. The decryption result 148 generally indicates whether the server 104 decrypted the cryptogram 134 or did not decrypt the cryptogram 134. In the example depicted in FIG. 1C, the decryption result 148 indicates that the server 104 decrypted the cryptogram 134. The account application 118 may use the decryption result 148 to determine whether the cryptogram 134 was decrypted. Based on the successful decryption, the OTP generator 142 may generate and transmit an OTP 150 to the computing device 102 based on the determined contact information. The OTP 150 may be any alphanumeric string of any length. If the contact information is a phone number, the OTP generator 142 may transmit the OTP 150 via a short message service (SMS) message. If the contact information is an email address, the OTP generator 142 may transmit the OTP 150 via email. If the contact information is a device identifier, the OTP generator 142 may transmit the OTP 150 as part of a push notification directed to the computing device 102.

The user may then provide the received OTP as input to the account application 118 via a user interface. The account application 118 may then compare the input provided by the user to an instance of the OTP 150 received from the OTP generator 142. In another embodiment, the account application 118 may transmit the user input to the OTP generator 142, which performs the comparison. If the OTP generator 142 performs the comparison, the OTP generator 142 transmits a comparison result to the account application 118. In some embodiments, the user may provide the input to another application, such as the web browser 140 that has loaded a page associated with the OTP generator 142. The web page may then perform the comparison. If the comparison results in a match, the multi-factor authentication may be completed, and the user may be able to perform one or more requested operations. For example, the user may view account attributes, perform an operation associated with the account, make a payment, transfer funds, view balances, etc.

Figure 2A:
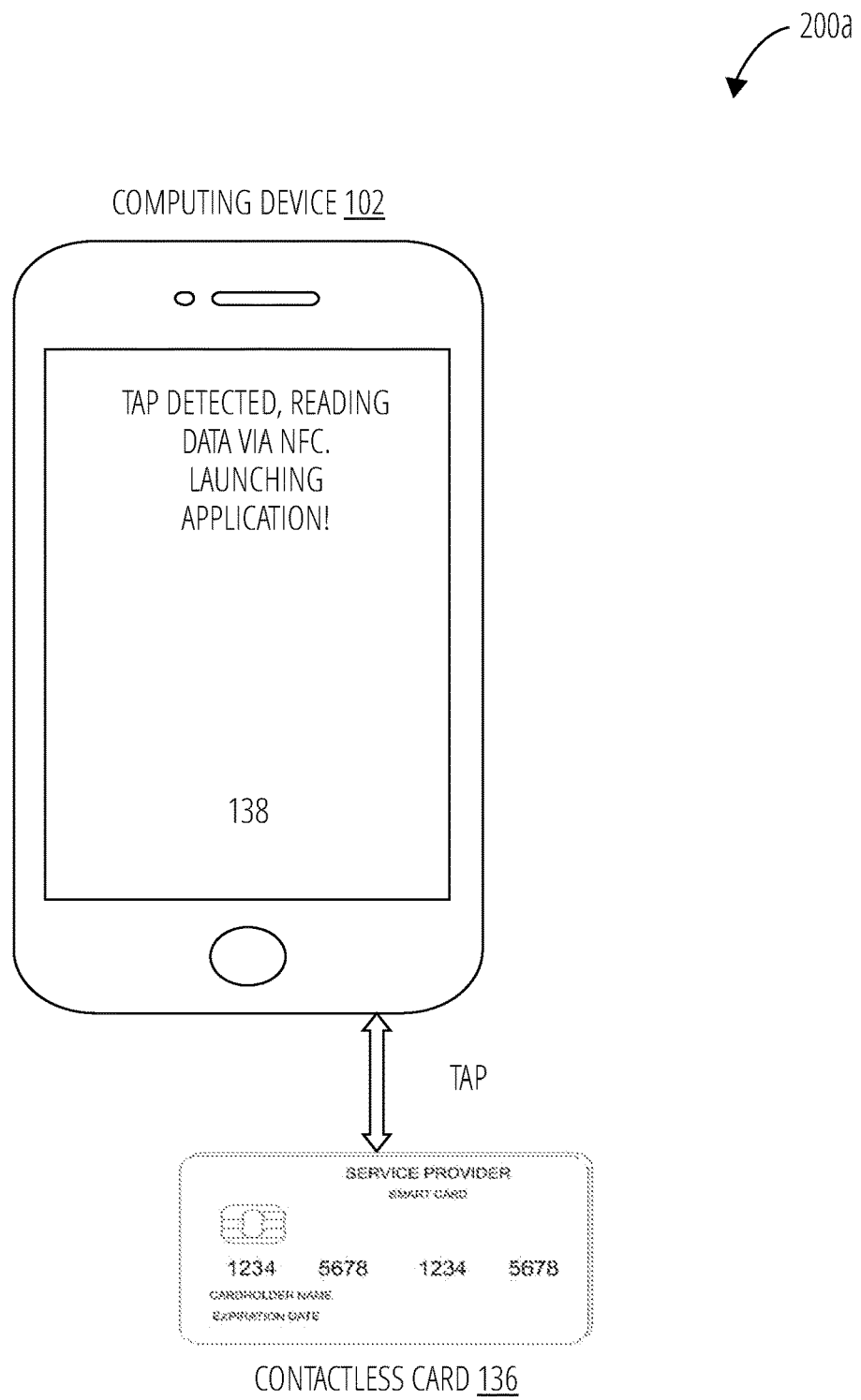
FIG. 2A illustrates an aspect of the subject matter in accordance with one embodiment.

FIG. 2A is a schematic 200a illustrating an embodiment where a contactless card 136 is tapped to a computing device 102. While the computing device 102 is depicted as outputting a screen (e.g., a home screen) of the operating system 138, the computing device 102 may generally be in any state. For example, the user may be using another application, such as the web browser 140, when tapping the contactless card 136 to the computing device 102.

As stated, when the contactless card 136 is tapped to the computing device 102, the applet 108 may generate a cryptogram 134 and URL 120. In some embodiments, the cryptogram 134 is a parameter of the URL 120. The applet 108 may further include an identifier, such as an unencrypted customer ID 116, an identifier of the contactless card 136, and the like. If the cryptogram 134 is a parameter of the URL 120, the unencrypted identifier may also be a parameter of the URL 120. Regardless of whether the cryptogram 134 and/or unencrypted identifier are parameters of the URL 120, the cryptogram 134, unencrypted identifier, and the URL 120 may be included in a data package, such as an NDEF file, that is read by the computing device 102. As shown, responsive to receiving the data package, the operating system 138 may launch the account application 118, as the URL 120 (or a portion thereof) may be registered with the account application 118 in the operating system 138.

Figure 2B:
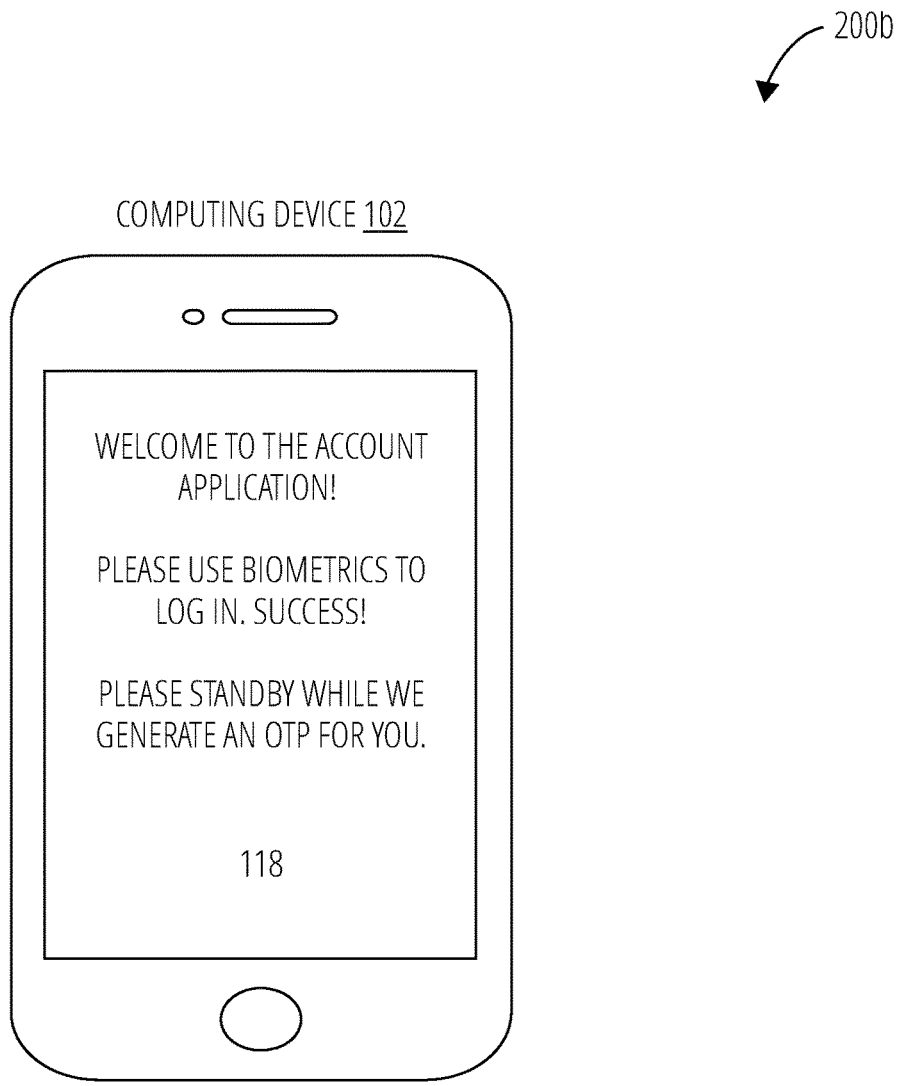
FIG. 2B illustrates an aspect of the subject matter in accordance with one embodiment.

FIG. 2B is a schematic 200b illustrating an embodiment where the account application 118 is opened responsive to the operating system 138 reading the URL 120 received from the contactless card 136. As shown, the account application 118 instructs the user to provide a first authentication factor, which may be biometric credentials. The account application 118 may verify the biometric credentials, and based on the verification, generate an OTP request 146 for an OTP 150 from the OTP generator 142. As stated, the account application 118 may transmit the cryptogram 134 and an unencrypted identifier to the OTP generator 142. In some embodiments, the OTP request 146 may be an API call.

The authentication application 126 may then attempt to decrypt the cryptogram 134 as described in greater detail above. If the decryption is successful, the authentication application 126 may identify contact information for the user's account in the account database 130. In some embodiments, the contact information is identified based on the unencrypted identifier, e.g., the unencrypted customer ID 116, a device ID, and the like. The authentication application 126 may then instruct the OTP generator 142 to generate an OTP 150 and transmit the OTP 150 to the contact information. The authentication application 126 may also transmit a decryption result 148 to the account application 118.

Figure 2C:
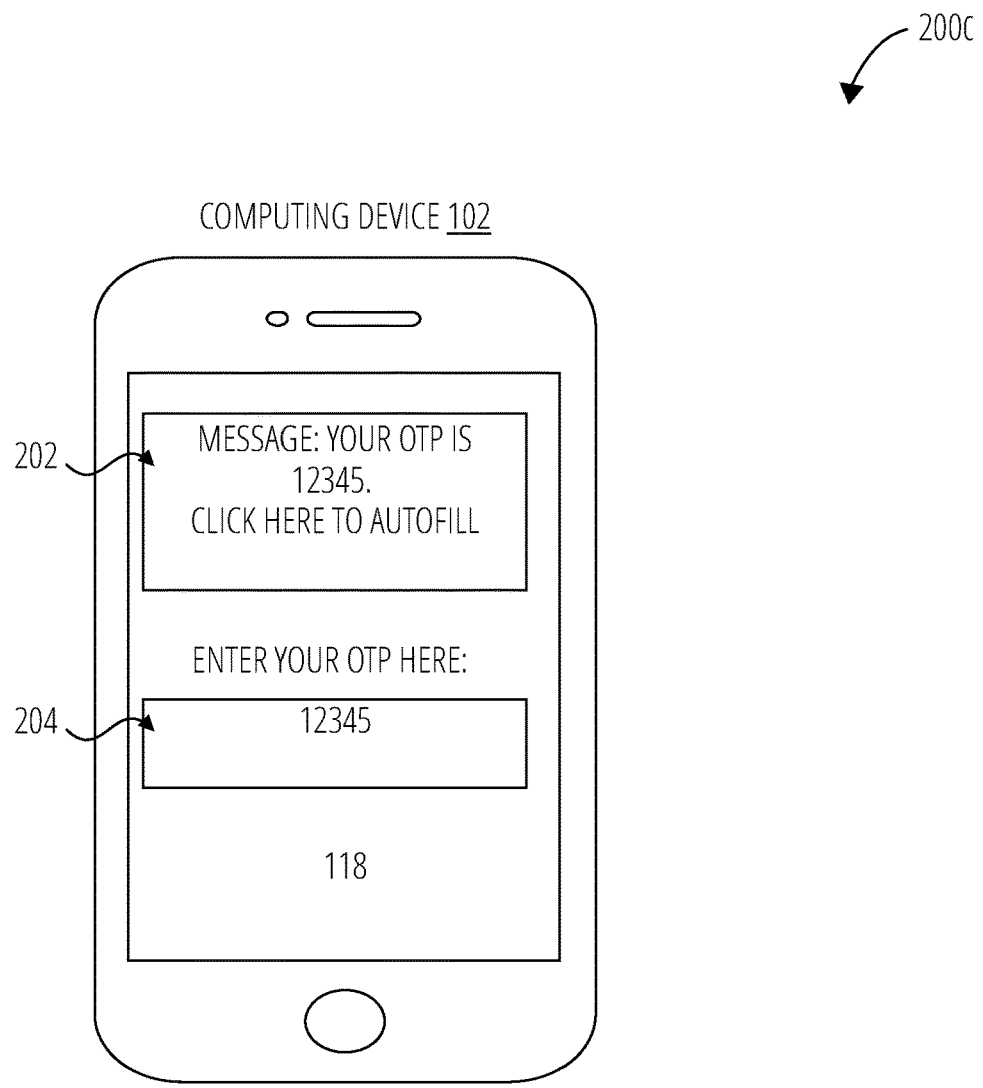
FIG. 2C illustrates an aspect of the subject matter in accordance with one embodiment.

FIG. 2C is a schematic 200c illustrating an embodiment where the OTP 150 is sent to the computing device 102 as a push notification 202. The user may be instructed to enter the OTP 150 in the input field 204. As shown, the push notification 202 allows the user to select the push notification 202 to autofill the OTP 150 to the field 204. For example, when selected, an autofill service (not pictured) of the operating system 138 may copy the OTP 150 and fill the OTP 150 into the field 204. In another example, the OTP 150 may be copied to a clipboard (not pictured) of the operating system 138. Doing so allows the user to paste the OTP 150 from the clipboard to the field 204.

As shown, the OTP 150 may be entered as input to field 204. The account application 118 may then verify the OTP 150 entered into field 204, e.g., by comparing the input to an instance of the OTP 150 received from the OTP generator 142. In another example, the account application 118 provides the input entered into field 204 to the OTP generator 142, which performs the comparison, and returns a result of the comparison to the account application 118. If the comparison results in a match, the account application 118 may determine the multi-factor authentication is complete.

Figure 2D:
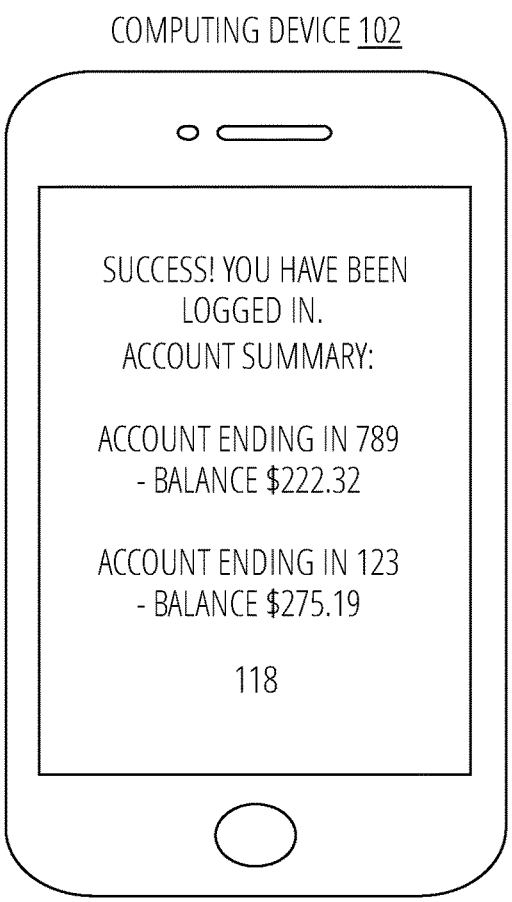
FIG. 2D illustrates an aspect of the subject matter in accordance with one embodiment.

FIG. 2D is a schematic 200d illustrating an embodiment where the input provided in field 204 matches the OTP 150. Based on the match and the decryption of the cryptogram 134, the user may be logged into their account in the account application 118. As shown, the account application 118 displays various account attributes, e.g., account balances. Embodiments are not limited in this context, as the MFA using the OTP 150 may be used to authorize any requested operation.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 3:
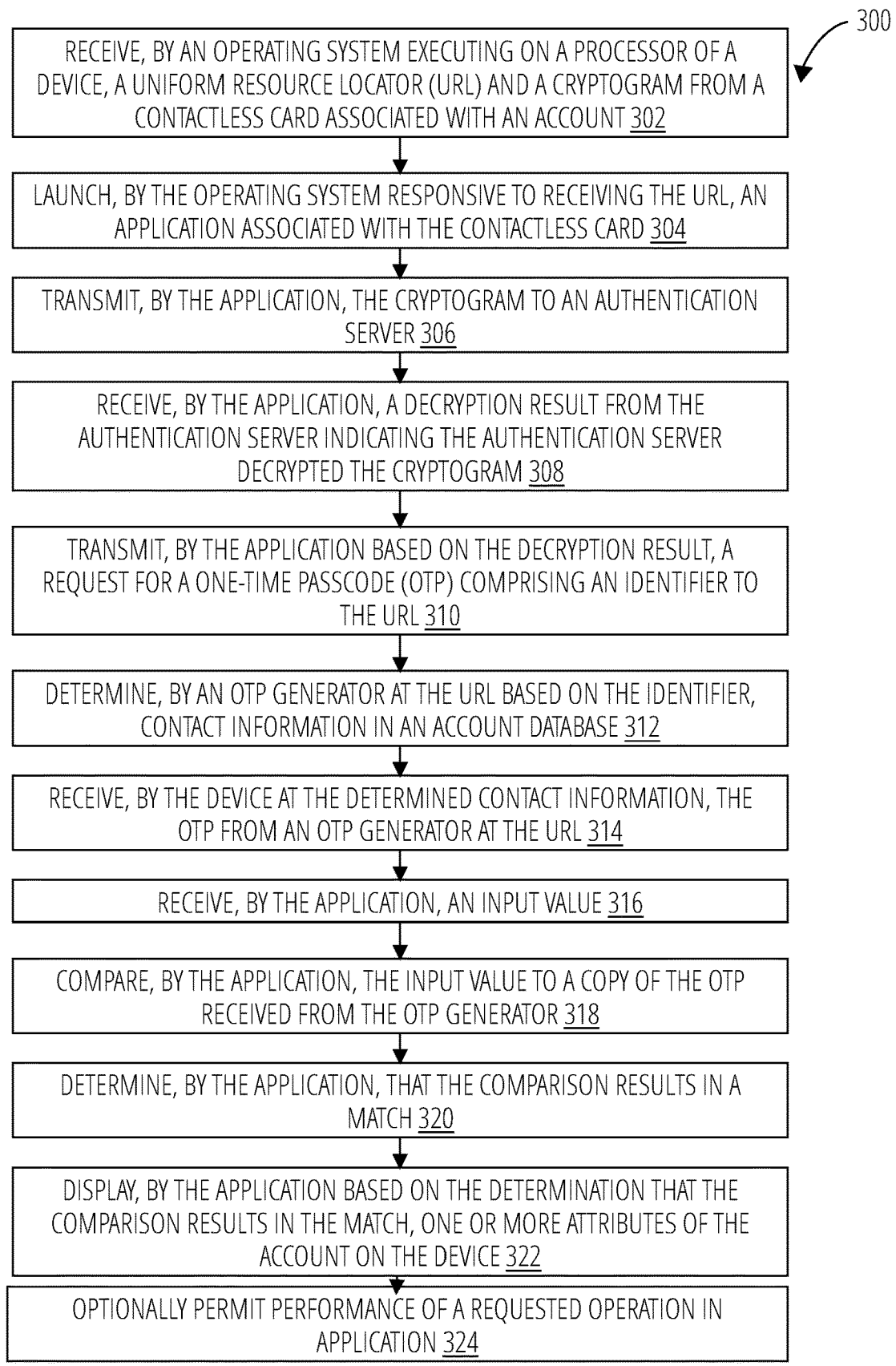
FIG. 3 illustrates a routine 300 in accordance with one embodiment.

FIG. 3 illustrates an embodiment of a logic flow, or routine, 300. The logic flow 300 may be representative of some or all of the operations executed by one or more embodiments described herein. For example, the logic flow 300 may include some or all of the operations to enable secure generation of an OTP using a contactless card. Embodiments are not limited in this context.

In block 302, routine 300 receives, by an operating system 138 executing on a processor of a computing device 102, a uniform resource locator (URL) 120 and a cryptogram 134 from a contactless card 136 associated with an account. In block 304, routine 300 launches, by the operating system 138 responsive to receiving the URL 120, the account application 118 associated with the contactless card 136. In some embodiments, however, the account application 118 is executing in the foreground of the operating system 138 and need not be launched. In such embodiments, the user may request to perform an operation, such as viewing an account balance, transferring funds, etc.

In block 306, routine 300 transmits, by the account application 118, the cryptogram 134 to an authentication server 104. The account application 118 may further include an unencrypted identifier, e.g., the customer ID 116 and/or a device identifier to the authentication application 126. In block 308, routine 300 receives, by the account application 118, a decryption result 148 from the server 104 indicating the authentication server 104 decrypted the cryptogram 134.

In block 310, routine 300 transmits, by the account application 118 based on the decryption result, a request for a one-time passcode (OTP) comprising an identifier to the server 104. The identifier may be the unencrypted customer ID 116, the device identifier, and/or an identifier of the contactless card 136. In block 312, routine 300 determines, by the server 104 based on the identifier, contact information in an account database 130. The contact information may include, but is not limited to, a phone number, email address, device identifier, etc. In block 314, routine 300 receives, by the computing device 102 at the determined contact information, the OTP 150 from the OTP generator 142. In block 316, routine 300 receives, by the account application 118, an input value from the user. In block 318, routine 300 compares, by the account application 118, the input value to a copy of the OTP received from the OTP generator 142. In block 320, routine 300 determines, by the account application 118, that the comparison results in a match. In block 322, routine 300 displays, by the account application 118 based on the decryption result 148 and the determination that the comparison results in the match, one or more attributes of the account on the device. Additionally and/or alternatively, the account application 118 may authorize performance of an operation requested by the user based on the determination that the comparison results in a match and the decryption result 148.

Figure 4:
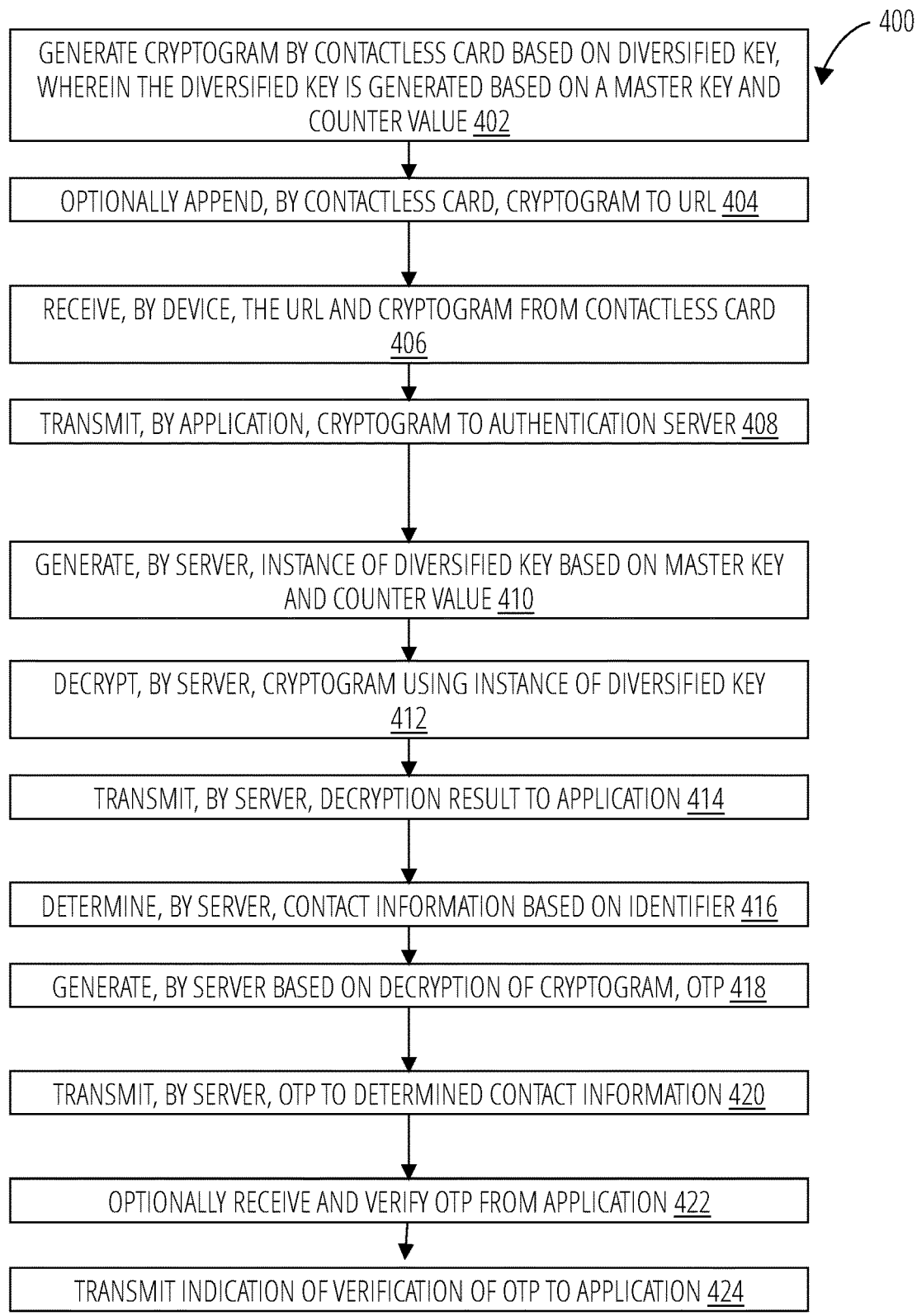
FIG. 4 illustrates a routine 400 in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations to enable secure generation of an OTP using a contactless card. Embodiments are not limited in this context.

In block 402, routine 400 receives, by an operating system 138 executing on a processor of a computing device 102, a uniform resource locator (URL) 120 and a cryptogram 134 from a contactless card 136 associated with an account. The applet 108 may generate the cryptogram 134 as described in greater detail herein. The applet 108 may further transmit an unencrypted identifier, e.g., customer ID 116 to the computing device 102. In block 404, routine 400 launches, by the operating system 138 responsive to receiving the URL 120, an account application 118 associated with the contactless card 136. In block 406, routine 400 transmits, by the account application 118, the cryptogram 134 to an authentication server 104. The account application 118 may further transmit the unencrypted identifier to the server 104.

In block 408, routine 400 receives, by the account application 118, a decryption result 148 from the authentication server 104 indicating the authentication server 104 decrypted the cryptogram 134. In block 410, routine 400 transmits, by the account application 118 based on the decryption result 148, a request for a one-time passcode (OTP) comprising an identifier to the URL. The identifier may be the unencrypted customer ID 116, the device identifier, and/or an identifier of the contactless card 136. In block 412, routine 400 determines, by the server 104 based on the identifier, contact information in an account database 130. The contact information may include, but is not limited to, a phone number, email address, device identifier, etc. In block 414, routine 400 receives, by the computing device 102 at the determined contact information, the OTP 150 from an OTP generator 142 at the URL 120. In block 416, routine 400 receives, by the account application 118, an input value. In block 418, routine 400 compares, by the account application 118, the input value to a copy of the OTP 150 received from the OTP generator 142. In block 420, routine 400 determines, by the application, that the comparison results in a match. In block 422, routine 400 displays, by the account application 118 based on the determination that the comparison results in the match and based on the decryption result 148, one or more attributes of the account on the device.

Figure 5A:
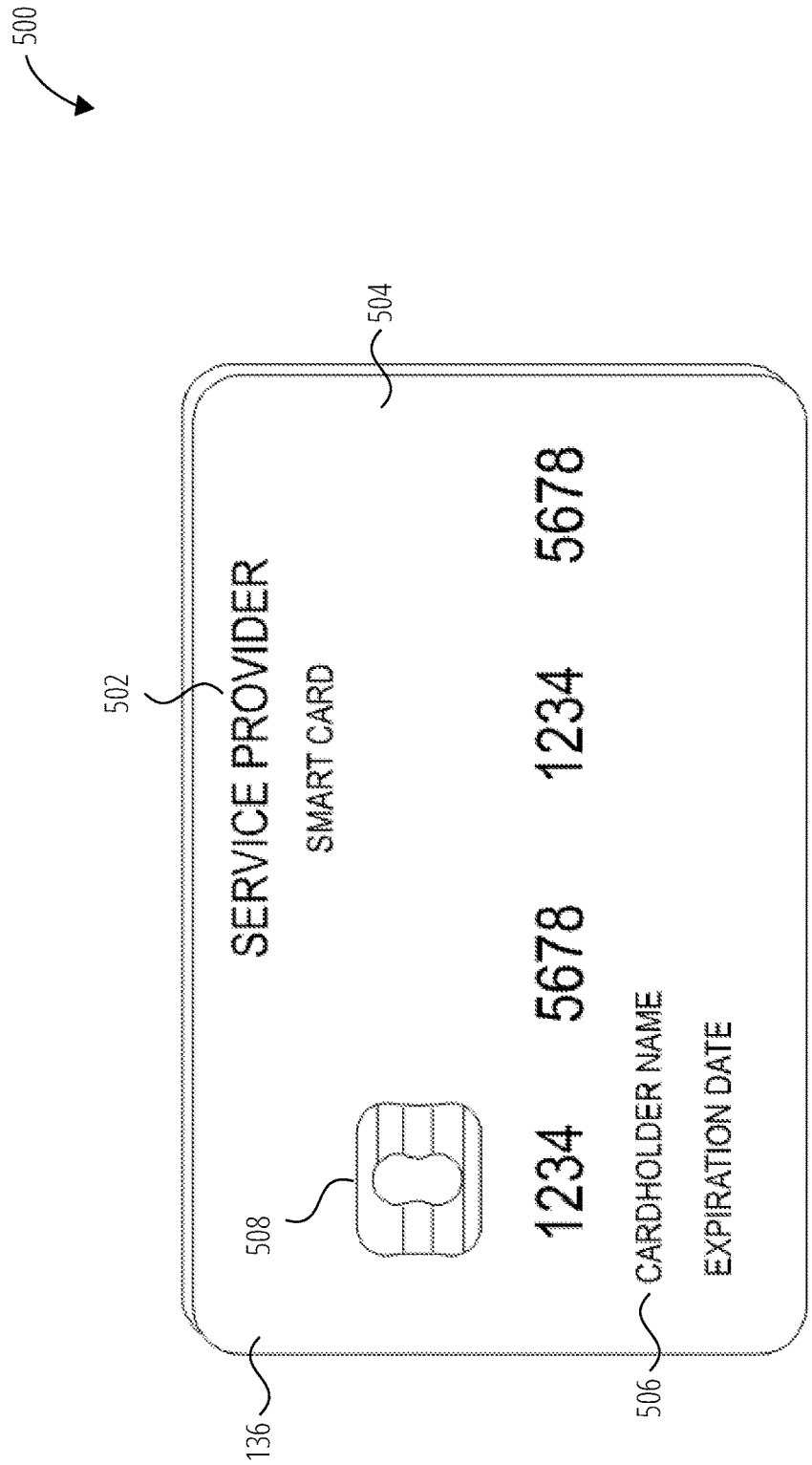
FIG. 5A illustrates a contactless card in accordance with one embodiment.

FIG. 5A is a schematic 500 illustrating an example configuration of a contactless card 136, which may include a payment card, such as a credit card, debit card, or gift card, issued by a service provider as displayed as service provider indicia 502 on the front or back of the contactless card 136. In some examples, the contactless card 136 is not related to a payment card, and may include, without limitation, an identification card. In some examples, the transaction card may include a dual interface contactless payment card, a rewards card, and so forth. The contactless card 136 may include a substrate 504, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 136 may have physical characteristics compliant with the ID-1 format of the ISO/IEC 7816 standard, and the transaction card may otherwise be compliant with the ISO/IEC 14443 standard. However, it is understood that the contactless card 136 according to the present disclosure may have different characteristics, and the present disclosure does not require a transaction card to be implemented in a payment card.

Figure 5B:
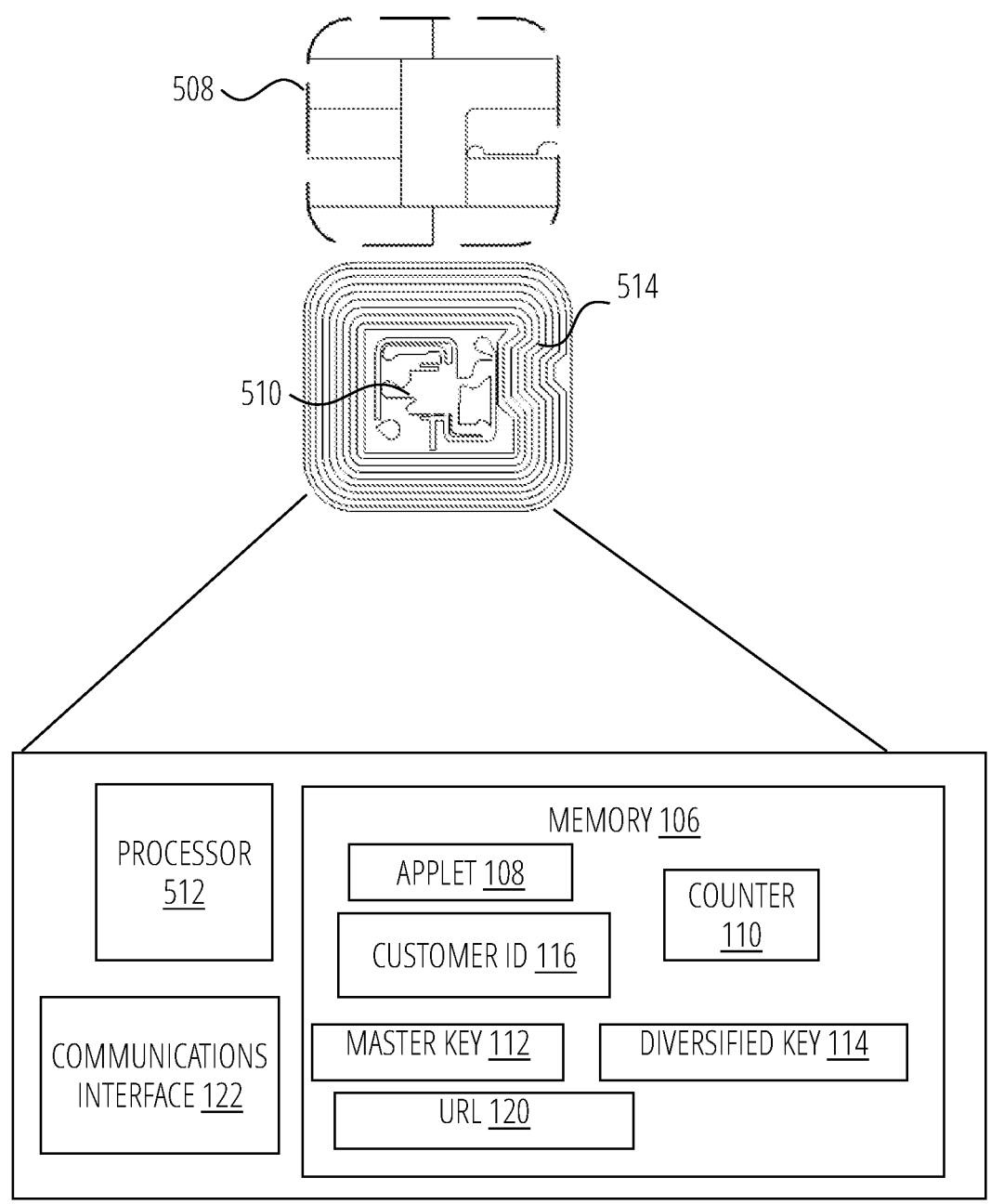
FIG. 5B illustrates a contactless card 136 in accordance with one embodiment.

The contactless card 136 may also include identification information 506 displayed on the front and/or back of the card, and a contact pad 508. The contact pad 508 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 136 may also include processing circuitry, antenna and other components as will be further discussed in FIG. 5B. These components may be located behind the contact pad 508 or elsewhere on the substrate 504, e.g. within a different layer of the substrate 504, and may electrically and physically coupled with the contact pad 508. The contactless card 136 may also include a magnetic strip or tape, which may be located on the back of the card (not shown in FIG. 5A). The contactless card 136 may also include a Near-Field Communication (NFC) device coupled with an antenna capable of communicating via the NFC protocol. Embodiments are not limited in this manner.

As illustrated in FIG. 2, the contact pad 508 of contactless card 136 may include processing circuitry 510 for storing, processing, and communicating information, including a processor 512, a memory 106, and one or more communications interface 122. It is understood that the processing circuitry 510 may contain additional components, including processors, memories, error and parity/CRC checkers, data encoders, anticollision algorithms, controllers, command decoders, security primitives and tamperproofing hardware, as necessary to perform the functions described herein.

The memory 106 may be a read-only memory, write-once read-multiple memory or read/write memory, e.g., RAM, ROM, and EEPROM, and the contactless card 136 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory. In some instances, the memory 106 may be encrypted memory utilizing an encryption algorithm executed by the processor 512 to encrypted data.

The memory 106 may be configured to store one or more applets 108, one or more counters 110, a customer ID 116, the master key 112, diversified key 114, and URLs 120. The one or more applets 108 may comprise one or more software applications configured to execute on one or more contactless cards, such as a Java® Card applet. However, it is understood that applet 108 are not limited to Java Card applets, and instead may be any software application operable on contactless cards or other devices having limited memory. The one or more counter 110 may comprise a numeric counter sufficient to store an integer. The customer ID 116 may comprise a unique alphanumeric identifier assigned to a user of the contactless card 136, and the identifier may distinguish the user of the contactless card from other contactless card users. In some examples, the customer ID 116 may identify both a customer and an account assigned to that customer and may further identify the contactless card 136 associated with the customer's account.

The processor 512 and memory elements of the foregoing exemplary embodiments are described with reference to the contact pad 508, but the present disclosure is not limited thereto. It is understood that these elements may be implemented outside of the contact pad 508 or entirely separate from it, or as further elements in addition to processor 512 and memory 106 elements located within the contact pad 508.

In some examples, the contactless card 136 may comprise one or more antenna(s) 514. The one or more antenna(s) 514 may be placed within the contactless card 136 and around the processing circuitry 510 of the contact pad 508. For example, the one or more antenna(s) 514 may be integral with the processing circuitry 510 and the one or more antenna(s) 514 may be used with an external booster coil. As another example, the one or more antenna(s) 514 may be external to the contact pad 508 and the processing circuitry 510.

In an embodiment, the coil of contactless card 136 may act as the secondary of an air core transformer. The terminal may communicate with the contactless card 136 by cutting power or amplitude modulation. The contactless card 136 may infer the data transmitted from the terminal using the gaps in the power connection of the contactless card 136, which may be functionally maintained through one or more capacitors. The contactless card 136 may communicate back by switching a load on the coil of the contactless card 136 or load modulation. Load modulation may be detected in the terminal's coil through interference. More generally, using the antenna(s) 514, processor 512, and/or the memory 106, the contactless card 136 provides a communications interface to communicate via NFC, Bluetooth, and/or Wi-Fi communications.

As explained above, contactless card 136 may be built on a software platform operable on smart cards or other devices having limited memory, such as JavaCard, and one or more or more applications or applets may be securely executed. Applet 108 may be added to contactless cards to provide a one-time password (OTP) for multifactor authentication (MFA) in various mobile application-based use cases. Applet 108 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include the URL 120, the cryptogram 134, and any other data.

One example of an NDEF OTP is an NDEF short-record layout (SR=1). In such an example, one or more applets 108 may be configured to encode the OTP as an NDEF type 4 well known type text tag. In some examples, NDEF messages may comprise one or more records. The applet 108 may be configured to add one or more static tag records in addition to the OTP record.

In some examples, the one or more applets 108 may be configured to emulate an RFID tag. The RFID tag may include one or more polymorphic tags. In some examples, each time the tag is read, different cryptographic data is presented that may indicate the authenticity of the contactless card. Based on the one or more applets 108, an NFC read of the tag may be processed, the data may be transmitted to a server, such as a server of a banking system, and the data may be validated at the server.

In some examples, the contactless card 136 and server may include certain data such that the card may be properly identified. The contactless card 136 may include one or more unique identifiers (not pictured). Each time a read operation takes place, the counter 110 may be configured to increment. In some examples, each time data from the contactless card 136 is read (e.g., by a mobile device), the counter 110 is transmitted to the server for validation and determines whether the counter 110 are equal (as part of the validation) to a counter of the server.

The one or more counter 110 may be configured to prevent a replay attack. For example, if a cryptogram has been obtained and replayed, that cryptogram is immediately rejected if the counter 110 has been read or used or otherwise passed over. If the counter 110 has not been used, it may be replayed. In some examples, the counter that is incremented on the contactless card 136 is different from the counter that is incremented for transactions. The contactless card 136 is unable to determine the application transaction counter 110 since there is no communication between applets 108 on the contactless card 136. In some examples, the contactless card 136 may comprise a first applet 440-1, which may be a transaction applet, and a second applet 440-2. Each applet 440-1 and 440-2 may comprise a respective counter 110.

In some examples, the counter 110 may get out of sync. In some examples, to account for accidental reads that initiate transactions, such as reading at an angle, the counter 110 may increment but the application does not process the counter 110. In some examples, when the mobile device 10 is woken up, NFC may be enabled and the device 102 may be configured to read available tags, but no action is taken responsive to the reads.

To keep the counter 110 in sync, an application, such as a background application, may be executed that would be configured to detect when the mobile device 102 wakes up and synchronize with the server of a banking system indicating that a read that occurred due to detection to then move the counter 110 forward. In other examples, Hashed One Time Password may be utilized such that a window of mis-synchronization may be accepted. For example, if within a threshold of 10, the counter 110 may be configured to move forward. But if within a different threshold number, for example within 10 or 1000, a request for performing re-synchronization may be processed which requests via one or more applications that the user tap, gesture, or otherwise indicate one or more times via the user's device. If the counter 110 increases in the appropriate sequence, then it possible to know that the user has done so.

The key diversification technique described herein with reference to the counter 110, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 136, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 136. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 136 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 6:
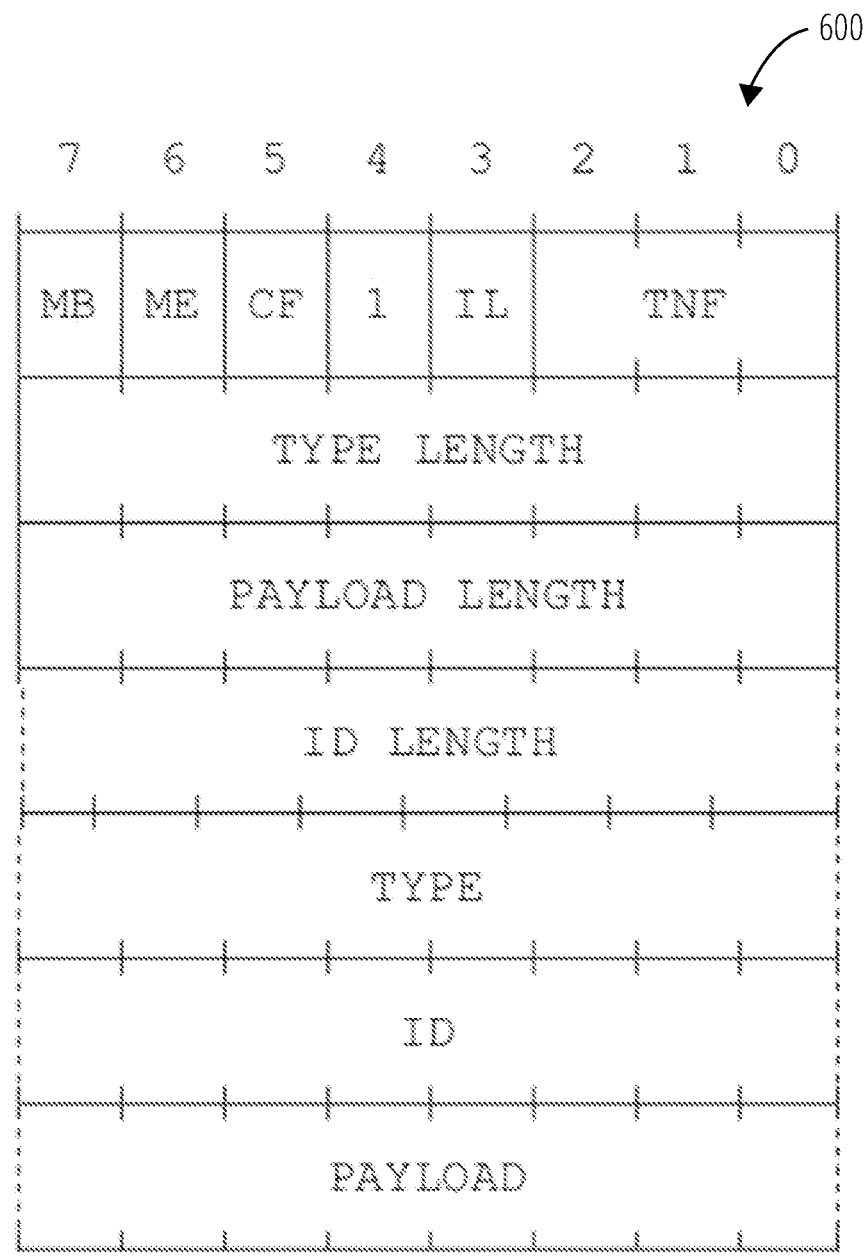
FIG. 6 illustrates a data structure 600 in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 600 may include the URL 120, the cryptogram 134, and any other data provided by the applet 108.

Figure 7:
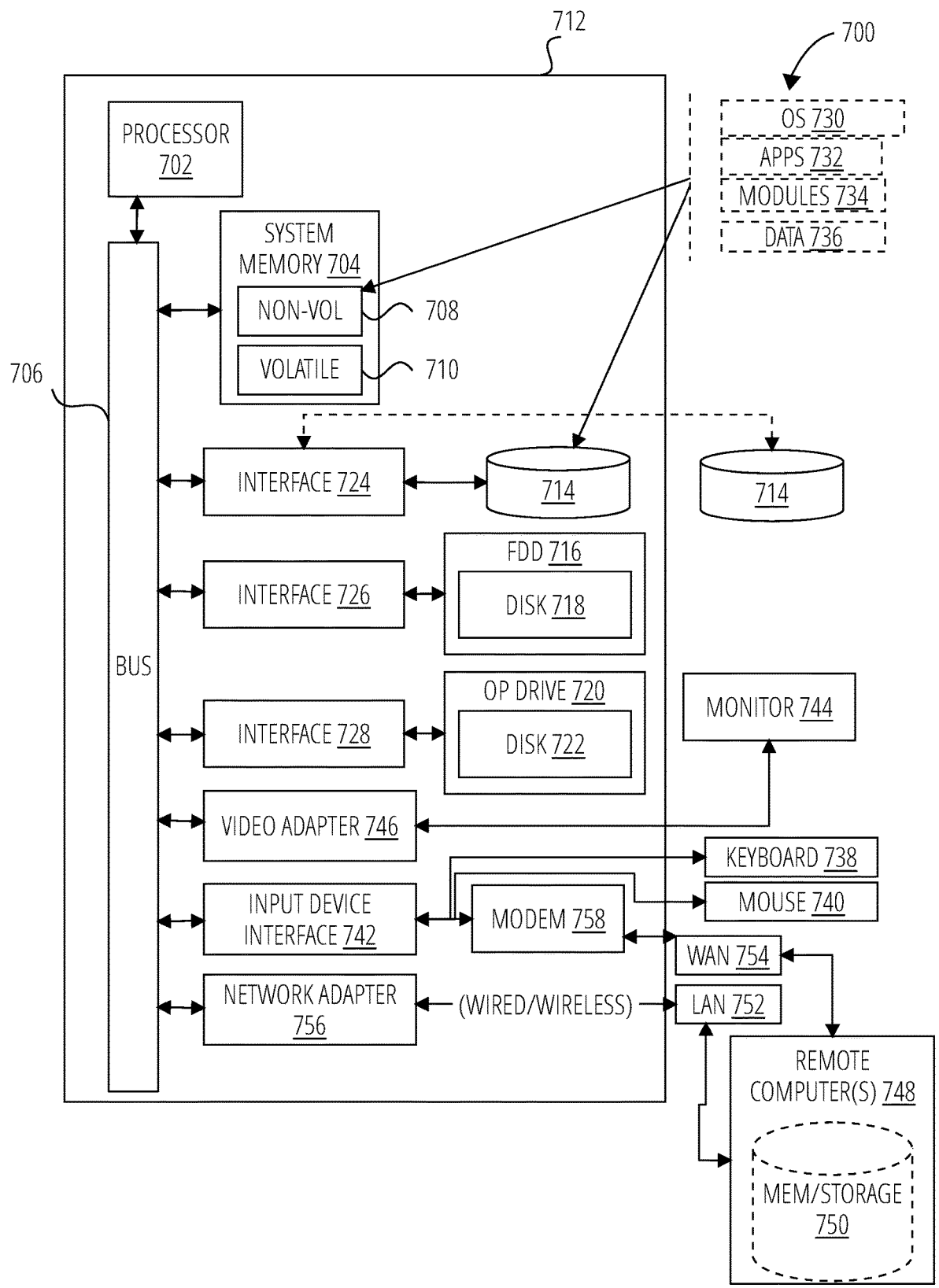
FIG. 7 illustrates a computer architecture 700 in accordance with one embodiment.

FIG. 7 illustrates an embodiment of an exemplary computer architecture 700 suitable for implementing various embodiments as previously described. In one embodiment, the computer architecture 700 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 7, the computer architecture 700 includes a processor 702, a system memory 704 and a system bus 706. The processor 702 can be any of various commercially available processors.

The system bus 706 provides an interface for system components including, but not limited to, the system memory 704 to the processor 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile 708 and/or volatile 710. A basic input/output system (BIOS) can be stored in the non-volatile 708.

The computer 712 may include various types of computer-readable storage media in the form of one or more lower speed memory units, including an internal (or external) hard disk drive 714, a magnetic disk drive 716 to read from or write to a removable magnetic disk 718, and an optical disk drive 720 to read from or write to a removable optical disk 722 (e.g., a CD-ROM or DVD). The hard disk drive 714, magnetic disk drive 716 and optical disk drive 720 can be connected to system bus 706 the by an HDD interface 724, and FDD interface 726 and an optical disk drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 708, and volatile 710, including an operating system 730, one or more applications 732, other program modules 734, and program data 736. In one embodiment, the one or more applications 732, other program modules 734, and program data 736 can include, for example, the various applications and/or components of the system 100.

A user can enter commands and information into the computer 712 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 702 through an input device interface 742 that is coupled to the system bus 706 but can be connected by other interfaces such as a parallel port, IEEE 1394 serial port, a game port, a USB port, an IR interface, and so forth.

A monitor 744 or other type of display device is also connected to the system bus 706 via an interface, such as a video adapter 746. The monitor 744 may be internal or external to the computer 712. In addition to the monitor 744, a computer typically includes other peripheral output devices, such as speakers, printers, and so forth.

The computer 712 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all the elements described relative to the computer 712, although, for purposes of brevity, only a memory and/or storage device 750 is illustrated. The logical connections depicted include wire/wireless connectivity to a local area network 752 and/or larger networks, for example, a wide area network 754. Such LAN and WAN networking environments are commonplace in offices and companies, and facilitate enterprise-wide computer networks, such as intranets, all of which may connect to a global communications network, for example, the Internet.

When used in a local area network 752 networking environment, the computer 712 is connected to the local area network 752 through a wire and/or wireless communication network interface or network adapter 756. The network adapter 756 can facilitate wire and/or wireless communications to the local area network 752, which may also include a wireless access point disposed thereon for communicating with the wireless functionality of the network adapter 756.

When used in a wide area network 754 networking environment, the computer 712 can include a modem 758, or is connected to a communications server on the wide area network 754 or has other means for establishing communications over the wide area network 754, such as by way of the Internet. The modem 758, which can be internal or external and a wire and/or wireless device, connects to the system bus 706 via the input device interface 742. In a networked environment, program modules depicted relative to the computer 712, or portions thereof, can be stored in the remote memory and/or storage device 750. It will be appreciated that the network connections shown are exemplary and other means of establishing a communications link between the computers can be used.

The computer 712 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

receiving, by an operating system (OS) executing on a processor of a device, a uniform resource locator (URL) and a cryptogram from a contactless card associated with an account;

launching, by the OS responsive to receiving the URL, an application associated with the contactless card;

transmitting, by the application, the cryptogram to an authentication server;

receiving, by the application, a decryption result from the authentication server indicating the authentication server decrypted the cryptogram;

transmitting, by the application based on the decryption result, a request for a one-time passcode (OTP) comprising an identifier to the URL;

receiving, by the device, the OTP from an OTP generator at the URL, wherein the OTP is distinct from the cryptogram;

receiving, by the application, an input value;

comparing, by the application, the input value to a copy of the OTP received from the OTP generator;

determining, by the application, that the comparison results in a match; and displaying, by the application based on the determination that the comparison results in the match, one or more attributes of the account on the device.

2. The method of claim 1, further comprising:

determining, by the application, the identifier in an account database on the device, wherein the identifier comprises one of an identifier of the contactless card or an identifier of the account.

3. The method of claim 1, further comprising:

receiving, by the device, the OTP via at least one of: (i) an email address associated with the identifier, (ii) a short message service (SMS) message at a phone number associated with the identifier, and (iii) a push notification received by the application based on a device identifier of the device associated with the identifier.

4. The method of claim 1, further comprising prior to transmitting the cryptogram to the authentication server:

receiving, by the application, authentication credentials for the account; and verifying, by the application, the received authentication credentials for the account.

5. The method of claim 4, further comprising subsequent to verifying the authentication credentials for the account:

receiving, by the application, a request to perform an operation associated with the account;

outputting, by the application, an indication specifying to tap the contactless card to the device to authorize the operation; and authorizing, by the application, the requested operation based on the decryption result indicating the authentication server decrypted the cryptogram and the determination that the comparison results in the match.

6. The method of claim 1, wherein the OS receives the URL and the cryptogram from the contactless card based on near field communication (NFC), the method further comprising:

providing, by the OS, the received OTP to an autofill service of the OS; and autofilling, by the autofill service, the OTP into a form field of the application.

7. The method of claim 1, wherein the URL is registered to launch the application in the OS, wherein the URL is directed to an application programming interface (API) endpoint for the OTP generator.

8. A system, comprising:

a processor; and a memory storing instructions that when executed by the processor cause the processor to:

receive, by an operating system (OS) executing on the processor, a uniform resource locator (URL) and a cryptogram from a contactless card associated with an account;

launch, by the OS responsive to receiving the URL, an application associated with the contactless card;

transmit, by the application, the cryptogram to an authentication server;

receive, by the application, a decryption result from the authentication server indicating the authentication server decrypted the cryptogram;

transmit, by the application based on the decryption result, a request for a one-time passcode (OTP) comprising an identifier to the URL; and receive, by the processor, the OTP from an OTP generator at the URL, wherein the OTP is distinct from the cryptogram;

receive, by the application, an input value;

compare, by the application, the input value to a copy of the OTP received from the OTP generator;

determine, by the application, that the comparison results in a match; and display, by the application based on the determination that the comparison results in the match, one or more attributes of the account.

9. The system of claim 8, the memory storing instructions that when executed by the processor cause the processor to:

determine, by the application, the identifier in an account database stored in the memory, wherein the identifier comprises one of an identifier of the contactless card or an identifier of the account.

10. The system of claim 8, the memory storing instructions that when executed by the processor cause the processor to:

receive, by the processor, the OTP via at least one of: (i) an email address associated with the identifier, (ii) a short message service (SMS) message at a phone number associated with the identifier, and (iii) a push notification received by the application based on a device identifier of the device associated with the identifier.

11. The system of claim 8, the memory storing instructions that when executed by the processor cause the processor to, prior to transmitting the cryptogram to the authentication server:

receive, by the application, authentication credentials for the account; and verify, by the application, the received authentication credentials for the account.

12. The system of claim 11, the memory storing instructions that when executed by the processor cause the processor to, subsequent to verifying the authentication credentials for the account:

receive, by the application, a request to perform an operation associated with the account;

output, by the application, an indication specifying to tap the contactless card to the system to authorize the operation; and authorize, by the application, the requested operation based on the decryption result indicating the authentication server decrypted the cryptogram and the determination that the comparison results in the match.

13. The system of claim 8, wherein the OS receives the URL and the cryptogram from the contactless card based on near field communication (NFC), the memory storing instructions that when executed by the processor cause the processor to:
provide, by the OS, the received OTP to an autofill service of the OS; and
autofill, by the autofill service, the OTP into a form field of the application.

14. The system of claim 8, wherein the URL is registered to launch the application in the OS, wherein the URL is directed to an application programming interface (API) endpoint for the OTP generator.

15. A non-transitory computer-readable storage medium storing computer-readable instructions that when executed by a processor cause the processor to:
receive, by an operating system (OS) executing on the processor, a uniform resource locator (URL) and a cryptogram from a contactless card associated with an account;
launch, by the OS responsive to receiving the URL, an application associated with the contactless card;
transmit, by the application, the cryptogram to an authentication server;
receive, by the application, a decryption result from the authentication server indicating the authentication server decrypted the cryptogram;
transmit, by the application based on the decryption result, a request for a one-time passcode (OTP) comprising an identifier to the URL; and
receive the OTP from an OTP generator at the URL, wherein the OTP is distinct from the cryptogram;
receive, by the application, an input value;
compare, by the application, the input value to a copy of the OTP received from the OTP generator;
determine, by the application, that the comparison results in a match; and
display, by the application based on the determination that the comparison results in the match, one or more attributes of the account on a display.

16. The non-transitory computer-readable storage medium of claim 15, further comprising instructions that when executed by the processor cause the processor to:
determine, by the application, the identifier in an account database stored in the medium, wherein the identifier comprises one of an identifier of the contactless card or an identifier of the account.

17. The non-transitory computer-readable storage medium of claim 15, further comprising instructions that when executed by the processor cause the processor to:
receive the OTP via at least one of: (i) an email address associated with the identifier, (ii) a short message service (SMS) message at a phone number associated with the identifier, and (iii) a push notification received by the application based on a device identifier of the device associated with the identifier.

18. The non-transitory computer-readable storage medium of claim 15, further comprising instructions that when executed by the processor cause the processor to, prior to transmitting the cryptogram to the authentication server:
receive, by the application, authentication credentials for the account; and
verify, by the application, the received authentication credentials for the account.

19. The non-transitory computer-readable storage medium of claim 18, further comprising instructions that when executed by the processor cause the processor to, subsequent to verifying the authentication credentials for the account:
receive, by the application, a request to perform an operation associated with the account;
output, by the application, an indication specifying to tap the contactless card to a device comprising the processor to authorize the operation; and
authorize, by the application, the requested operation based on the decryption result indicating the authentication server decrypted the cryptogram and the determination that the comparison results in the match.

20. The non-transitory computer-readable storage medium of claim 15, wherein the OS receives the URL and the cryptogram from the contactless card based on near field communication (NFC), wherein the URL is registered to launch the application in the OS, wherein the URL is directed to an application programming interface (API) endpoint for the OTP generator, the medium further comprising instructions that when executed by the processor cause the processor to:
provide, by the OS, the received OTP to an autofill service of the OS; and
autofill, by the autofill service, the OTP into a form field of the application.

\* \* \* \* \*